United States Patent [19]

Cho

[11] 4,187,764
[45] Feb. 12, 1980

[54] FAST-ACTING VALVE ACTUATOR
[75] Inventor: Nakwon Cho, Knoxville, Tenn.
[73] Assignee: The United States of America as represented by the United States Department of Energy, Washington, D.C.
[21] Appl. No.: 270,796
[22] Filed: Jul. 12, 1972
[51] Int. Cl.² ............................................. F01B 3/00
[52] U.S. Cl. ...................................... 91/442; 91/443; 91/459; 137/596.16
[58] Field of Search .................... 251/30; 91/442, 443, 91/459, 461; 137/596.16

[56] References Cited
U.S. PATENT DOCUMENTS 3,390,943  7/1968  Myers ..................................... 251/30
3,460,798  8/1969  Carsten ................................... 251/30

Primary Examiner—Harvey E. Behrend
Attorney, Agent, or Firm—R. V. Lupo; Robert M. Poteat; Stephen D. Hamel

[57] ABSTRACT

A fast-acting valve actuator utilizes a spring driven pneumatically loaded piston to drive a valve gate. Rapid exhaust of pressurized gas from the pneumatically loaded side of the piston facilitates an extremely rapid piston stroke. A flexible selector diaphragm opens and closes an exhaust port in response to pressure differentials created by energizing and de-energizing a solenoid which controls the pneumatic input to the actuator as well as selectively providing a venting action to one side of the selector diaphragm.

5 Claims, 2 Drawing Figures

FAST-ACTING VALVE ACTUATOR

BACKGROUND OF THE INVENTION

The invention relates generally to valve actuators and more particularly to an improved fast-acting valve actuator suitable for use with isolation valves in a gas centrifuge cascade. It was made in the course of, or under, a contract with the U. S. Atomic Energy Commission.

Valve actuators made in accordance with the invention are especially intended for use in applications where extremely fast valve action is required in one direction only. One such application is in connection with gas centrifuge cascades being developed for uranium isotope enrichment. Individual machines in a centrifuge cascade must be equipped with fast-acting isolation valves to provide pressure surge protection to the cascade. Pressure surge protection is necessary in a gas centrifuge cascade since the failure of a single gas centrifuge could otherwise generate a pressure surge in the process gas which is capable of causing additional machine failures in a domino fashion. Fast valve actuation is necessary in one direction only as the opening time of isolation valves is normally not important.

It is, accordingly, a general object of the invention to provide a fast-acting valve actuator.

Other objects of the invention will become apparent upon examination of the following description of the invention and the appended drawings.

SUMMARY OF THE INVENTION

In accordance with the invention, a valve actuator which is fast acting in one direction is provided. The actuator includes a housing; a spring driven, pneumatically loaded piston reciprocably mounted within the housing; a selector diaphragm for opening and closing an exhaust port in gaseous communication with the pneumatic side of the piston; and a solenoid for respectively controlling the admittance of supply air to the pneumatic side of the piston when the exhaust port is closed and the piston pneumatically loaded and for shutting off supply air when the exhaust port is opened and rapid piston advance is desired. Venting action concurrent with the shutting off of supply air is also controlled by the solenoid in order to cause the selector diaphragm to deflect and open the exhaust plenum to the pneumatic side of the piston.

DESCRIPTION OF THE PREFERRED EMBODIMENT

Figure 1:
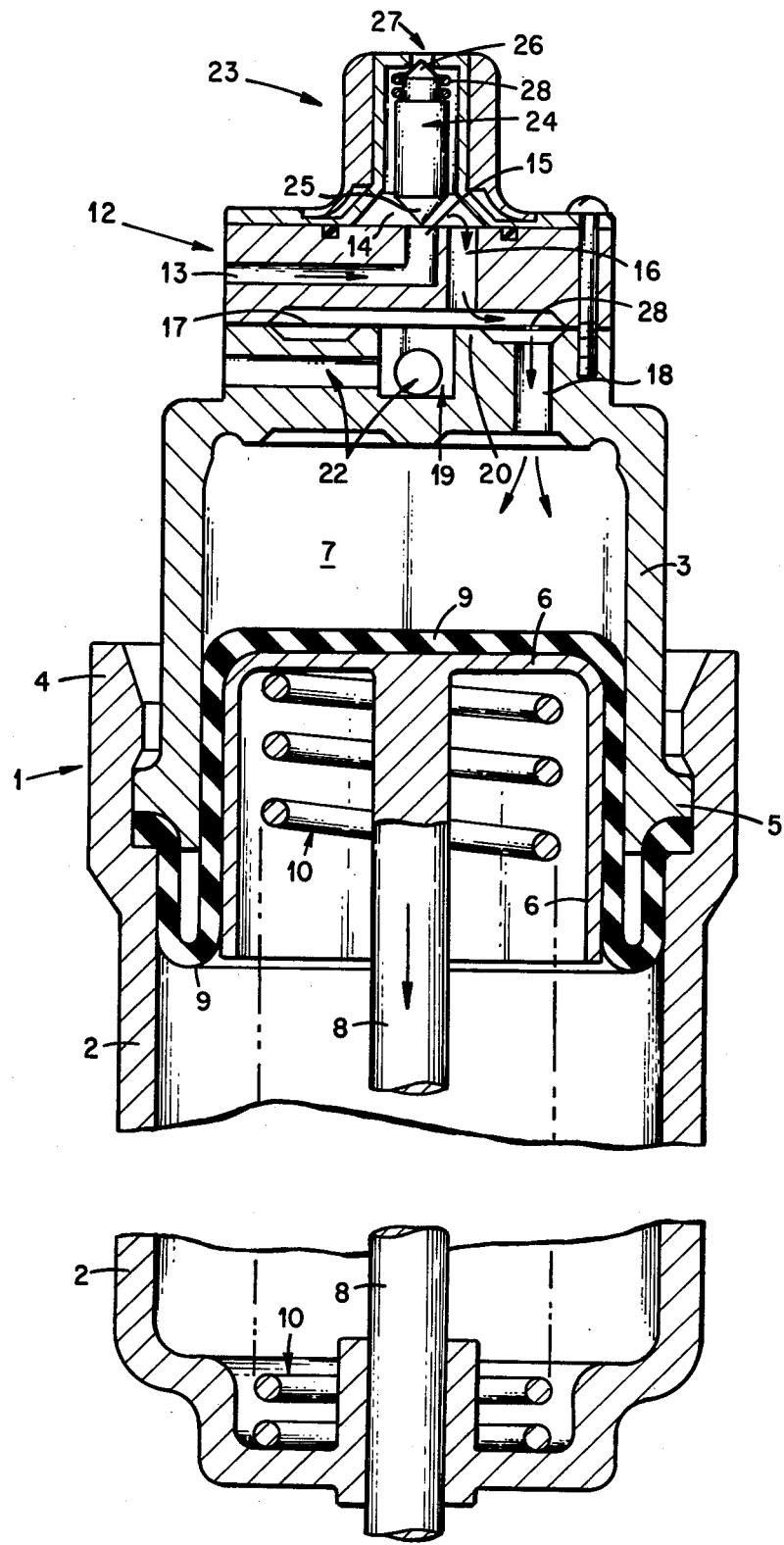
FIG. 1 is a vertical sectional view of a valve actuator made in accordance with the invention in a pneumatically loaded condition.

Referring now to the drawings, initially to FIG. 1, a vertically sectioned view of a valve actuator made in accordance with the invention is shown. Although the actuator could be used with many valves where rapid closing or opening action is required, it was especially designed for use with the valve described in copending application Ser. No. 253,260 of common assignee. That valve was designed to isolate gas centrifuges in a cascade of gas centrifuges in order to avoid machine failures caused by pressure propogation through the cascade.

As shown, a hollow, generally cylindrical, piston housing 1 comprises lower and upper portions 2 and 3 joined together in a snap fit by means of lip 4 on lower portion 2 and rim 5 on upper portion 3. Piston 6 reciprocates within the upper portion of housing 1 in response to changes in air pressure within cavity 7 above the piston. For purposes of this disclosure, cavity 7 is also referred to as the pneumatic side of piston 6. A corresponding reciprocal motion is imparted to connecting rod 8 which is connected to piston 6 at its upper end and extends through the bottom of housing 1 at its lower end for connection to a valve. Flexible rubber sealing sleeve 9 is clamped about its periphery between the upper and lower portions of piston housing 1 and extends over piston 6 to prevent leakage of air from cavity 7 past the piston. The downward force on piston 1 exerted by pressurized air in cavity 7 is opposed by a cylindrical helical compression spring 10 disposed between the underside of piston 6 and the inside bottom of lower portion 2.

Mounted to the top of piston housing 1 is an air inlet and exhaust assembly 12 for controlling the flow of air into and out of cavity 7. Air inlet and exhaust assembly 12 defines an air supply passageway 13 which is adapted to discharge into plenum 14 through air supply orifice 15. Passageway 16 leads from plenum 14 to the air supply side of a flexible selector diaphragm 17. Passageway 18 leads from the exhaust side of the selector diaphragm to cavity 7. An exhaust plenum 19 is centrally located on the exhaust side of selector diaphragm 17 and is defined in part by a raised rim 20 which is contacted by the selector diaphragm in its undeflected state, as shown in FIG. 1. A plurality of open exhaust passageways 22 vent exhaust plenum 19 to the atmosphere. Exhaust plenum 19 and passageways 22 are referred to collectively as an exhaust port.

A double acting solenoid 23 is mounted atop air inlet and exhaust assembly 12 to control the actuator in response to electrical signals. Within solenoid 23 is a hexagonal bar armature 24 having opposed conical end faces 25 and 26 for blocking air supply orifice 15 and vent orifice 27 through the top of the solenoid, respectively. With solenoid 23 de-energized, spring 28 urges armature 24 downward, thereby forcing end face 25 against air supply orifice 15 so as to prevent air from passing into plenum 14. Electrical activation of solenoid 23 energizes the solenoid coil which, in turn, causes armature 24 to move upwardly against spring 28, thereby sealing vent 27 and opening orifice 15, as shown in FIG. 1.

Rapid operation of the subject actuator occurs on piston upstroke only and valve selection for a particular application should be made accordingly. Isolation valves as described in copending application Ser. No. 307,674, now U.S. Pat. No. 3,807,257 are designed to close on the valve stem upstroke and are thus ideally suited for use with this actuator. It will be apparent to those skilled in the valve art that rapid valve opening rather than closing may also be achieved where desired by proper valve selection.

Figure 2:
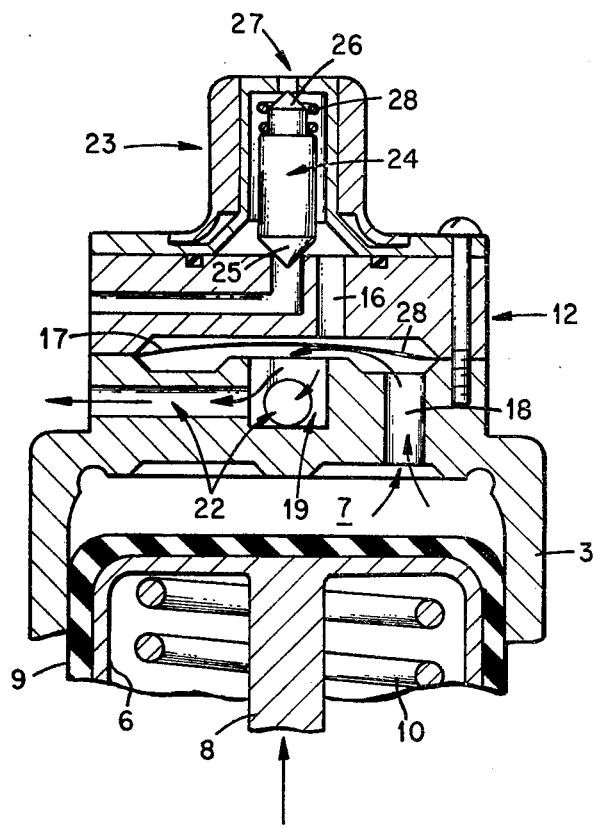
FIG. 2 is a portional sectional view of the valve actuator of FIG. 1 showing the actuator during fast-action operation.

Operation of the subject actuator is illustrated by FIGS. 1 and 2 where piston downstroke (pneumatically loaded) and upstroke (quick-action) modes are shown, respectively. As indicated above, the downstroke operation of the actuator is relatively slow in comparison with its upstroke operation. Where the actuator is to be used to drive a rapid-acting isolation valve, for example, piston 6 will normally be positioned retracted downward within piston housing 1 at or below its position as shown in FIG. 1. In that position spring 10 will be compressed so that it exerts considerable upward force against the piston. Once piston 6 has reached its lowermost position, the actuator is loaded and rapid upstroke may be accomplished when needed in the manner illustrated in FIG. 2.

As shown in FIG. 1, piston 6 is driven downward against spring 10 pneumatically by the action of air pressure in cavity 7. This is accomplished by energizing solenoid 23, thereby causing armature 24 to move upward in order to block vent 27 and simultaneously open air supply orifice 25. Pressurized supply air discharging from orifice 15 into plenum 14 passes from that plenum through passageway 16 to the air supply side of selector diaphragm 17. As indicated by the flow arrows, the pressurized supply air passes through one or more narrow slits 28 in the selector diaphragm to its exhaust side. Supply air reaching the exhaust side of the selector diaphragm passes through passageway 18 to cavity 7 where it drives piston 6 against spring 10. Downward travel of piston 6 and compressive displacement of spring 10 stops when a mechanical stop is reached. Preferably the pressure of the supply air is sufficient to overcome the force exerted by spring 10 at its point of maximum deflection so that there are positive mechanical limits on piston travel. The valve mechanism (not sown) will normally act as a mechanical stop to piston travel because of the fully open and closed mechanical limits normally found on most valve gates to which the piston and connecting rod will be linked.

Once piston 6 has reached its lowermost position, flow of supply air to cavity 7 will stop. Selector diaphragm 17 will remain tightly fitted against exhaust plenum 19, however, because of the low pressure (atmospheric) inside the exhaust plenum. Gradual changes on the pressure of the supply air above or below that of the pressure in cavity 7 are equalized by compensating flow through slits 28. A relatively constant pressure source of supply is necessary for successful operation of the subject valve actuator, however.

FIG. 2 illustrates the subject valve actuator in its fast action mode with piston 6 being driven upward by spring 10. As shown, armature 24 has been driven downward by spring 28 following de-energization of solenoid 23, thereby closing orifice 15 and opening vent orifice 27. This action creates an instantaneous pressure drop across selector diaphragm 17, with the higher pressure existing on the exhaust side of the diaphragm surrounding the exhaust plenum because of the pressure in cavity 7. This pressure differential causes diaphragm 17 to flex in the manner shown in FIG. 2, thereby opening a path between exhaust plenum 19 and the compressed air in cavity 7. Once exhaust plenum 19 has been opened, pressurized supply air in cavity 7 is free to exhaust to the atmosphere as shown by the flow arrows. Additional passageways 18 (only one shown) may be provided between cavity 7 and the exhaust side of selector diaphragm 17 to facilitate the rapid exhaust of supply air and the rapid upstroke of piston 6 under the influence of spring 10. Little or no supply air passes through slits 28 in the selector diaphragm during the exhaust mode.

In practice, it has been found that an air pressure differential equivalent to as little as one-half inch of water is sufficient to activate selector diaphragm 17 and thereby initiate the actions described above in reference to FIGS. 1 and 2. Tests using the subject actuator have resulted in valve closure times of 30, 40 and 60 milliseconds for 1, 1-½, and 2 inch diameter valves, respectively. Opening time, which is not critical where the valves are needed for isolation purposes, has been found to be about ½ second.

The above description of one embodiment of the invention is intended to illustrate the invention and should not be interpreted in a strictly limiting sense. For example, piston upstroke and downstroke designations were used for convenience in reference to the drawings although the actuator and associated valves may be used in any convenient orientation without detriment to actuator operation. In addition, although the actuator was developed for use with isolation valves requiring rapid operation, other applications will be apparent to those skilled in the valve art. It is intended, rather, that the invention be limited only by the scope of the appended claims.

What is claimed is:

1. A fast-acting valve actuator comprising:
    (a) a piston housing;
    (b) a piston reciprocably mounted within said housing having a spring driven side and a pneumatically loaded side;
    (c) a connecting rod fixed to the spring driven side of said piston and extending out of said housing;
    (d) a spring disposed within said piston housing acting on the spring driven side of said piston;
    (e) an air inlet and exhaust assembly defining:
        (i) a disk-shaped control cavity having opposed air supply and exhaust sides;
        (ii) an air supply passageway in communication with the air supply side of said control cavity;
        (iii) an exhaust port in communication with the central portion of the exhaust side of said control cavity and atmosphere; and
        (iv) a connecting passageway extending between the exhaust side of said control cavity and the interior of said piston housing at a point on the pneumatically loaded side of said piston;
    (f) a flexible diaphragm disposed intermediate the air supply and exhaust sides of said control cavity, said diaphragm being slit at an intermediate radial position to provide fluid communication between said air supply passageway and said connecting passageway; and
    (g) means for selectively admitting pressurized air to said air supply passageway and venting said air supply passageway to the atmosphere.

2. The valve actuator of claim 1 wherein said means for selectively admitting pressurized air to said air supply passageway and venting said air supply passageway to the atmosphere comprises an electrically energized solenoid having a spring loaded armature with opposed sealing surfaces adapted to sealably engage respective pressurized air supply and vent orifices in fluid communication with said air supply passageway.

3. The valve actuator of claim 2 wherein said armature is spring loaded to sealably engage said air supply orifice.

4. The valve actuator of claim 1 wherein said exhaust side of said control cavity is provided with a raised lip portion about said exhaust port where it opens into said exhaust side.

5. The valve actuator of claim 4 wherein said flexible diaphragm contacts said raised lip portion when undeflected.

* * * * *